United States Patent
Bibeau et al.

(10) Patent No.: US 7,402,924 B2
(45) Date of Patent: Jul. 22, 2008

(54) COOLING ASSEMBLY FOR ELECTRIC MACHINE

(75) Inventors: Louis-Philippe Bibeau, Montreal (CA); Jane Roundell, Saint-Lambert (CA); Jean-François Lavigne, LaPrairie (CA)

(73) Assignee: TM4 Inc., Quebec (CA)

( * ) Notice: Subject to any disclaimer, the term of this patent is extended or adjusted under 35 U.S.C. 154(b) by 258 days.

(21) Appl. No.: 11/440,968

(22) Filed: May 24, 2006

(65) Prior Publication Data
US 2006/0273668 A1    Dec. 7, 2006

Related U.S. Application Data

(60) Provisional application No. 60/685,876, filed on Jun. 1, 2005.

(51) Int. Cl.
*H02K 9/00*    (2006.01)
*H02K 9/20*    (2006.01)

(52) U.S. Cl. .............................. 310/54; 310/52; 310/59; 310/254

(58) Field of Classification Search ............. 310/52–54, 310/57–59, 254
See application file for complete search history.

(56) References Cited

U.S. PATENT DOCUMENTS

| | | | | |
|---|---|---|---|---|
| 3,049,634 A | * | 8/1962 | Horsley ....................... | 310/64 |
| 3,109,947 A | * | 11/1963 | Thompson et al. ........... | 310/64 |
| 3,681,628 A | * | 8/1972 | Krastchew ................... | 310/54 |
| 3,963,950 A | * | 6/1976 | Watanabe et al. ............. | 310/54 |
| 4,516,044 A | * | 5/1985 | Bone .......................... | 310/64 |
| 4,797,588 A | * | 1/1989 | Capion ....................... | 310/54 |
| 5,473,207 A | * | 12/1995 | Hopeck et al. ............... | 310/65 |
| 6,819,016 B2 | | 11/2004 | Houle et al. | |
| 2002/0167232 A1 | * | 11/2002 | Randall ....................... | 310/54 |
| 2004/0012272 A1 | | 1/2004 | Houle et al. | |

\* cited by examiner

*Primary Examiner*—Thanh Lam
(74) *Attorney, Agent, or Firm*—Fay Kaplun & Marcin, LLP (57) ABSTRACT

A cooling assembly including a generally cylindrical body to be inserted inside the generally cylindrical internal stator of an electric machine is described herein. The body includes a cylindrical external contact surface configured and sized to contact the internal surface of the stator. The bottom surface of the body is machine with a channel that is partially closed by a cover to yield a peripheral fluid passage inside the body. An inlet and an outlet aperture are provided.

12 Claims, 7 Drawing Sheets

COOLING ASSEMBLY FOR ELECTRIC MACHINE

CLAIM OF PRIORITY

The application claims the benefit of U.S. Provisional Application Ser. No. 60/685,876 filed on Jun. 1, 2005, the specification of which is expressly incorporated herein, in its entirety, by reference.

FIELD OF THE INVENTION

The present invention relates to electric machines. More specifically, the present invention is concerned with a cooling assembly to be mounted inside the internal stator of an electric machine.

BACKGROUND OF THE INVENTION

Electric machines are well known in the art. They usually have a fixed stator and a rotating rotor. Generally, the stator is external and the rotor is rotatably mounted inside the stator, coaxially therewith.

In some electric machines, the stator is internal and the cylindrical rotor is coaxially mounted outside the stator. These machines will be referred herein as internal stator electric machines.

Cooling internal stator machines is a challenge since one cannot rely on the air surrounding the stator as a cooling medium to cool the stator by convection. Indeed, it is well known that heat is mainly generated inside the stator of an electric machine. When the stator is external, fins may be added to the machine casing and the machine may be cooled by convection. However, when the stator is surrounded by the rotor, adequate convection cooling may not take place and other ways must be devised to extract heat from the internal stator.

OBJECTS OF THE INVENTION

An object of the present invention is therefore to provide a cooling device for an electric machine.

SUMMARY OF THE INVENTION

More specifically, in accordance with the present invention, there is provided a cooling assembly to be inserted in the internal stator of an electric machine, the internal stator being provided with an internal surface, the cooling assembly comprising:

a tubular body provided with a gap and an external surface configured and sized as to be applied to the internal surface of the internal stator; the tubular body being provided with a bottom surface defining a cooling channel; the tubular body being also provided with an inlet and an outlet provided on either side of the gap and open to the cooling channel;

a cover so configured and sized as to be mounted to the bottom surface so as to close the cooling channel;

a biasing assembly so mounted to the body in the vicinity of the gap as to selectively biais the external surface of the body against the internal surface of the stator;

wherein a fluid passage between the inlet and the outlet is defined by the cooling channel closed by the cover.

Other objects, advantages and features of the present invention will become more apparent upon reading of the following non-restrictive description of preferred embodiments thereof, given by way of example only with reference to the accompanying drawings.

DETAILED DESCRIPTION

Generally stated, the present invention proposes the use of a generally cylindrical body to be inserted inside the generally cylindrical internal stator of an electric machine. The body includes a cylindrical external contact surface configured and sized to contact the internal surface of the stator. The bottom surface of the body is machine with a channel that is partially closed by a cover to yield a peripheral fluid passage inside the body. An inlet and an outlet aperture are provided.

Turning now to FIGS. 1 to 10 of the appended drawings, a cooling assembly 20 according to an illustrative embodiment of the present invention will be described.

Figure 1:
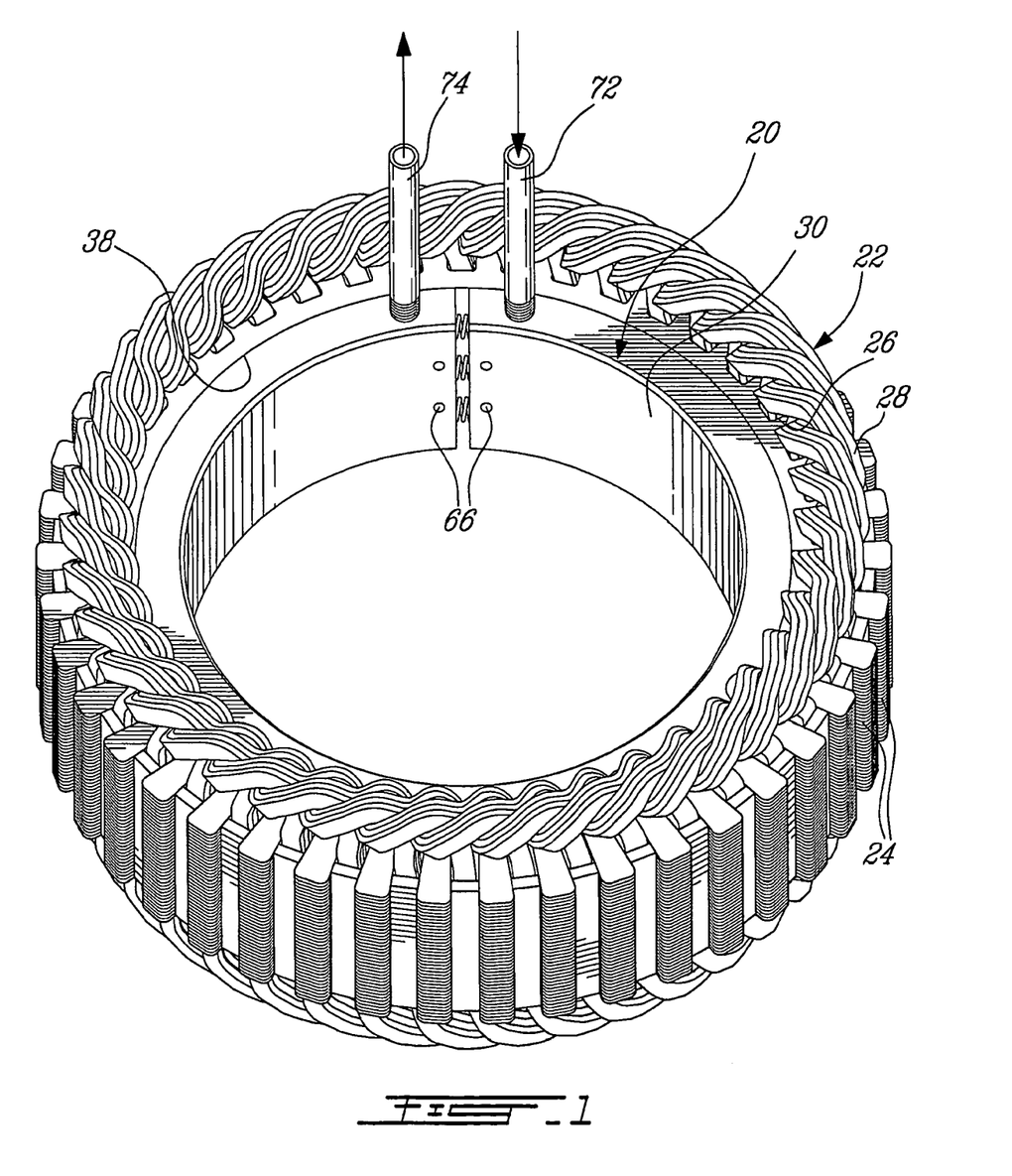
FIG. 1 is a perspective view of an internal stator of an electric machine provided with a cooling device according to a first embodiment of the present invention.

In FIG. 1, the cooling assembly 20 is shown mounted inside an internal stator 22 of an electric machine (not shown). The stator 22 includes a plurality of laminations 24 that are stacked to provide the desired stator thickness. The laminations 24 include peripheral notches 26 configured and sized to receive coils 28 therein. Since stators and electric machines are believed well known in the art, they will not be further described herein.

Figure 2:
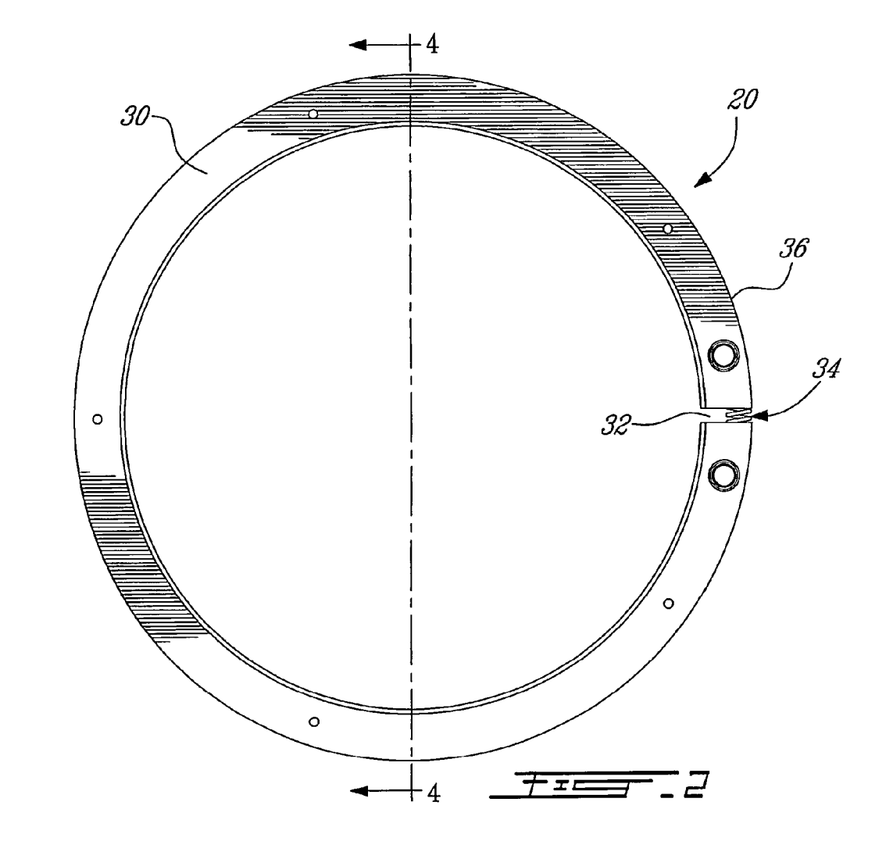
FIG. 2 is a top plan view of the cooling device of FIG. 1.

As can be seen in FIG. 2, the cooling assembly 20 includes a cylindrical body 30 having a generally circular cross-section provided with a gap 32 allowing a slight deformation of the body 30 for its insertion into the stator 22 as will be described hereinbelow. A biasing assembly 34 is provided to bias the external surface 36 of the cooling assembly 20 towards the internal surface 38 (see FIG. 1) of the stator 22.

Figure 3:
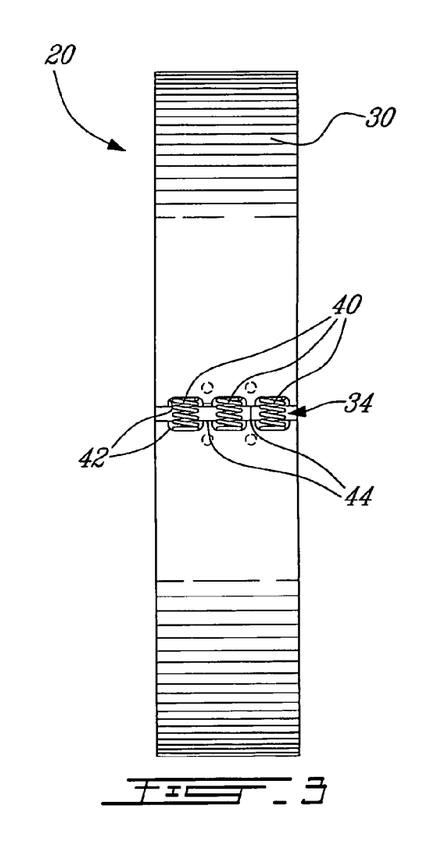
FIG. 3 is a side elevation view of the cooling device of FIG. 1.

The biasing assembly 34 will now be briefly described with respect to FIG. 3. The biasing assembly 34 includes three compression springs 40 inserted in shoulders 42 of the facing ends 44 of the body 30 to thereby biais the ends 44 away from one another.

Figure 11:
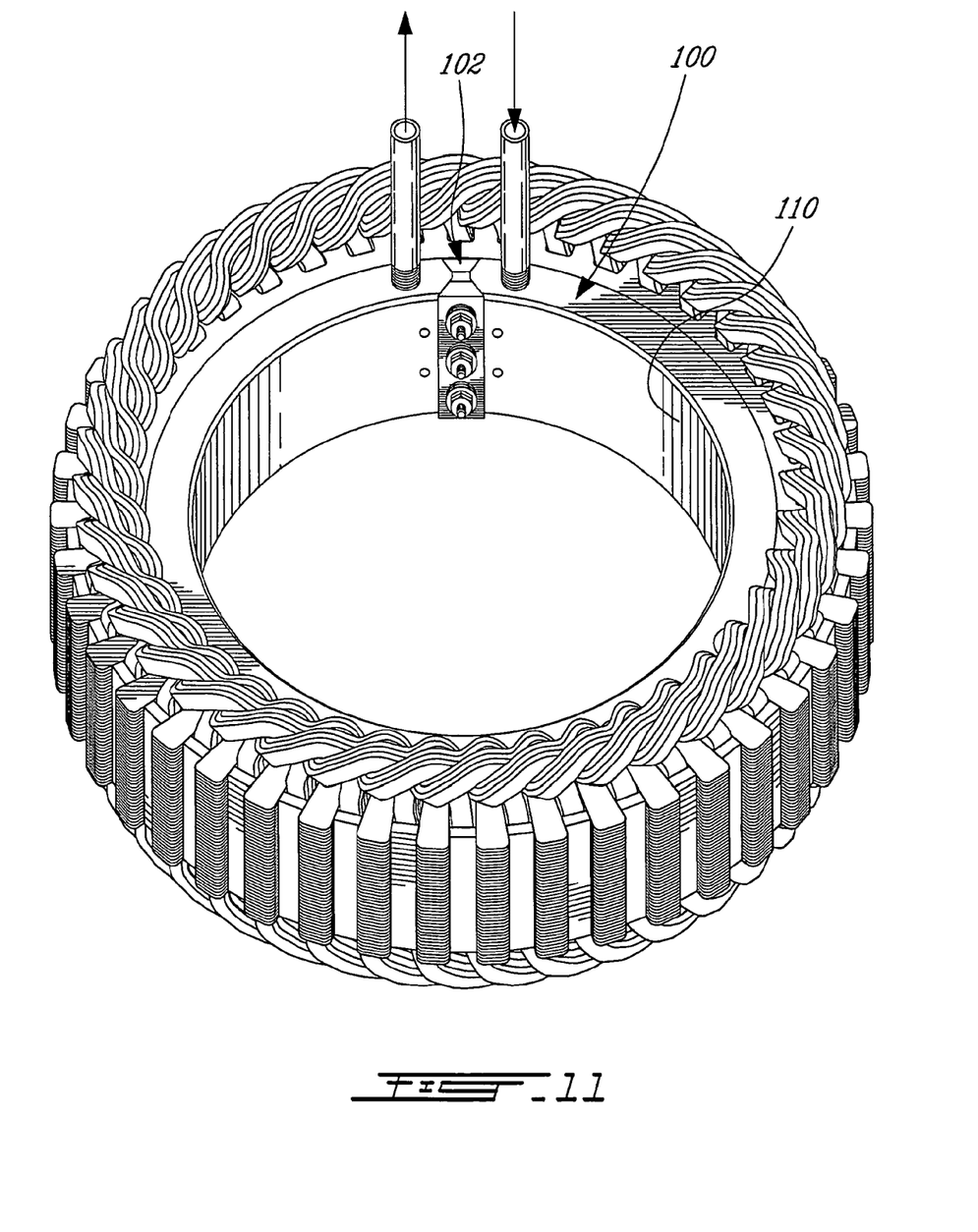
FIG. 11 is a perspective view of an internal stator of an electric machine provided with a cooling device according to a second embodiment of the present invention.
Figure 12:
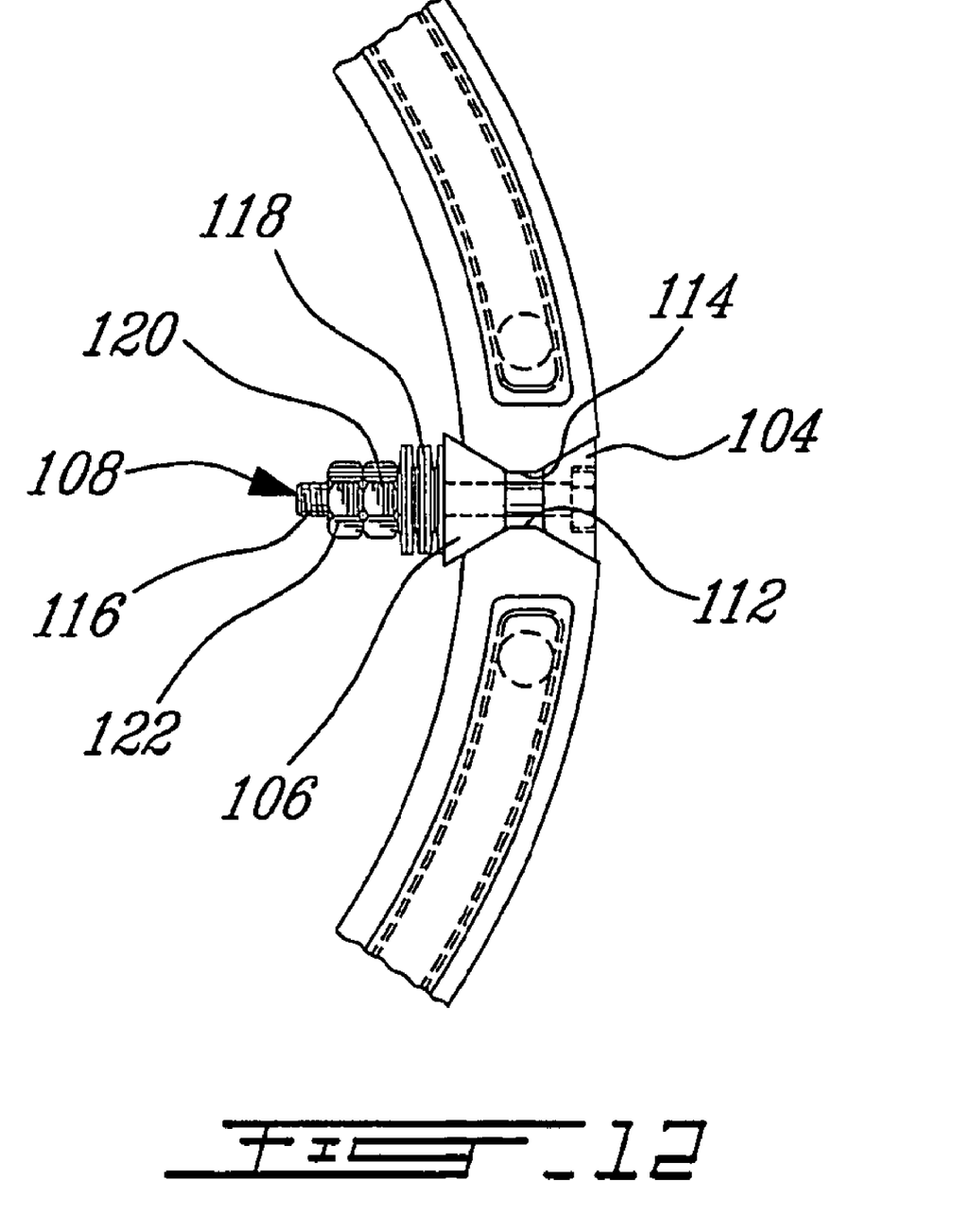
FIG. 12 is a top plan view of the biasing assembly of the cooling device of FIG. 11.

Of course, one skilled in the art will understand that other biasing assemblies, for example as illustrated in FIGS. 11 and 12 and described hereinbelow, may be used.

Figure 4:
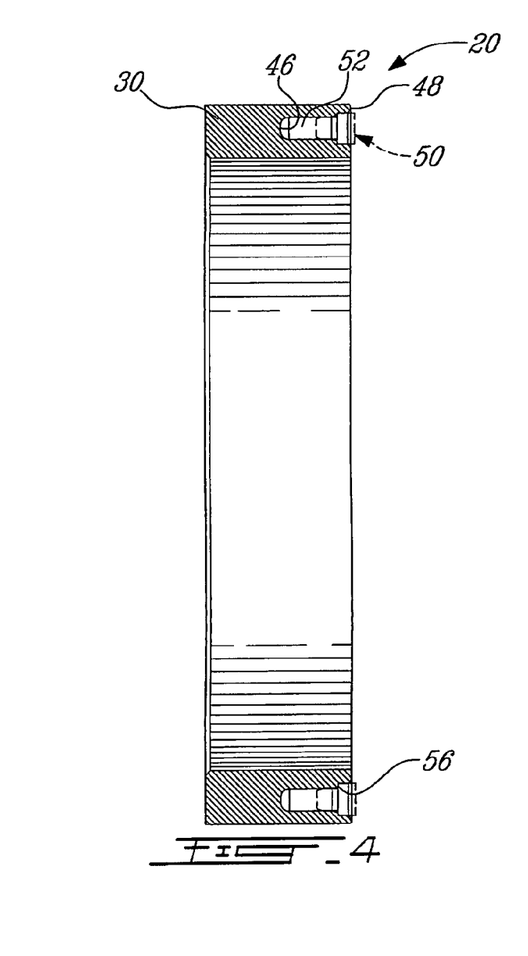
FIG. 4 is a sectional view taken along line 4-4 of FIG. 2.

FIG. 4 illustrates the cooling assembly 20 in a sectional view. As can be seen, an elongated channel 46 having a generally T-shaped cross-section is provided on the bottom surface 48 of the body 30. The channel 46 is closed by a cover 50 having a generally T-shaped cross-section. The cover 50 does not reach the bottom of the channel 46, thereby leaving a fluid passage 52 in the thickness of the body 30. The cover 50 is maintained to the bottom surface 48 of the body 30 by a heat resistant adhesive or by other means, as will be described hereinbelow.

Figure 5:
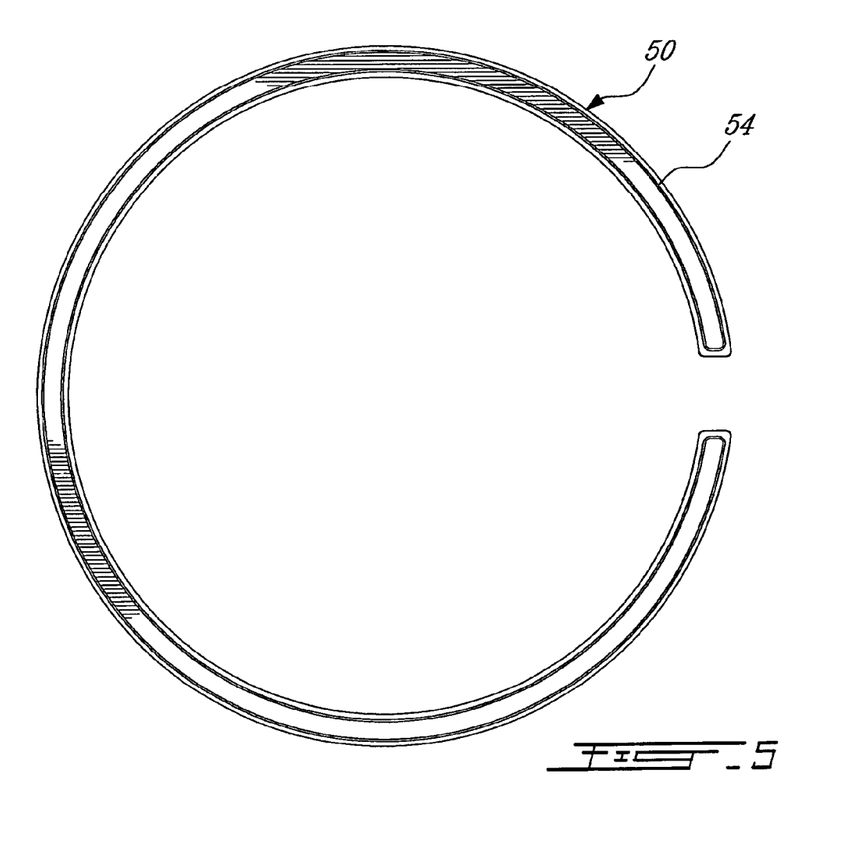
FIG. 5 is a bottom plan view of a cover of the cooling device of FIG. 1.

FIG. 5 of the appended drawings shows the underside of the cover 50, i.e. the side that enters the channel 46. The general T-shape cross-section of the cover 50 provides a peripheral ledge 54 contacting the shoulder 56 of the channel 58. An adhesive (not shown) may be provided between the ledge 54 and the shoulder 56 to fixedly and permanently mount the cover 50 to the body 30. The adhesive is advantageously heat resistant and permanent. An example of such an adhesive is the Loctite™ 609 Retaining Compound Fast Curing. It also has been found that some sealant, for example, Loctite™ Flange Sealant 518 Gasket Eliminator, may be added to the adhesive.

Figure 6:
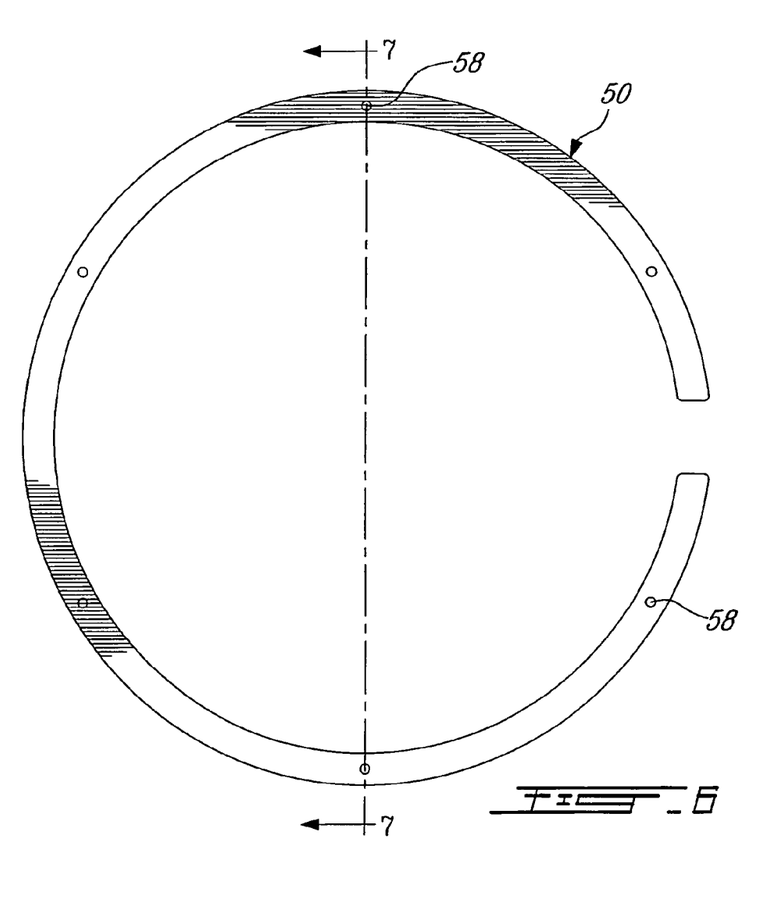
FIG. 6 is a top plan view of the cover of FIG. 5.
Figure 7:
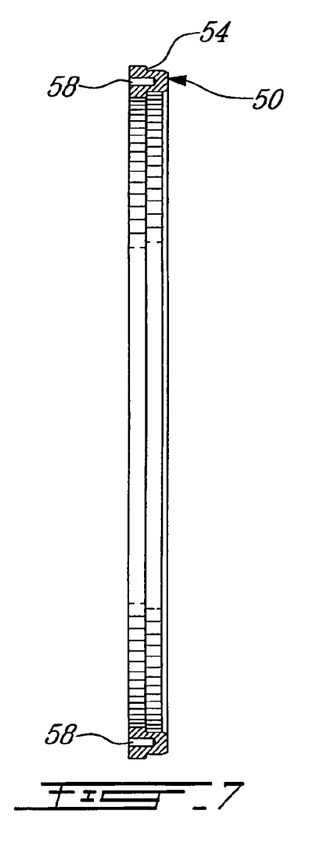
FIG. 7 is a sectional view taken along line 7-7 of FIG. 6.

FIGS. 6 and 7 respectively illustrate the cover 50 in a top plan and in a sectional view. The generally T-shape cross-section of the cover 50 is more apparent from FIG. 7. These figures also illustrate small apertures 58 positioned peripherally on the external face of the cover 50. These apertures are used to position the insertion tool (not shown) when the cover 50 is installed to the body 30. These apertures 58 are also useful should the cover 50 be temporarily mounted to the body 30 and should it be required to remove the cover 50 therefrom.

Figure 8:
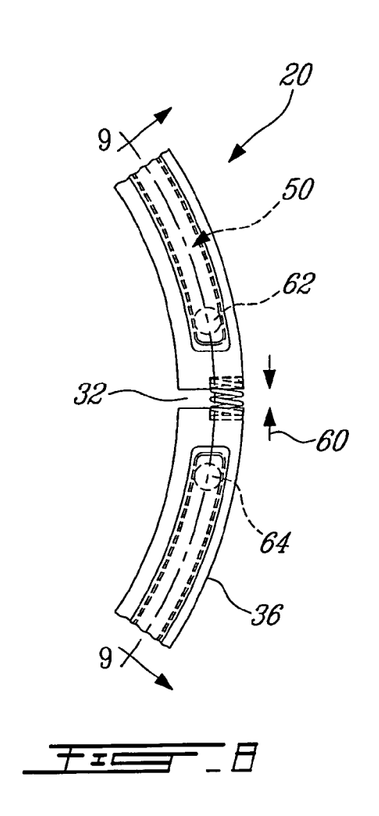
FIG. 8 is a sectional view of a portion of the cooling device of FIG. 1, illustrating the biasing elements used to maintain the cooling element inside the stator.

FIG. 8 illustrates the compression (see arrow 60) of the cooling assembly 20 for its insertion inside the stator 22 (FIG. 1) and illustrates the position of the inlet 62 and outlet 64 with respect to the fluid passage 52. To compress the cooling assembly 20, custom pliers (not shown) connect with the apertures 66 (FIG. 9) to reduce the gap 32 and thereby compress the springs 40. Once the cooling assembly 20 is inserted inside the stator 22, the force applied by the pliers (not shown) is removed, letting the springs 40 apply a force biasing the external surface 36 of the cooling assembly 20 towards the internal surface 38 (see FIG. 1) of the stator 22.

Figure 9:
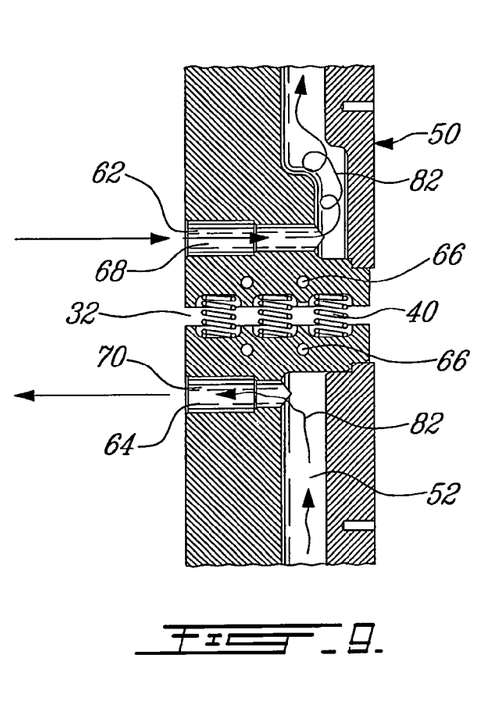
FIG. 9 is a sectional view taken along line 9-9 of FIG. 8, illustrating the flow of cooling fluid inside the cooling assembly.

As can be better seen from FIG. 9, the inlet 62 and the outlet 64 have respective larger portions 68 and 70 to respectively receive connectors 72 and 74 (see FIG. 1). The connectors 72 and 74 may be screwed in to supply and remove cooling fluid from the cooling assembly 20, or may be press fitted therein and the fluid tightness may be assured, for example by applying some Loctite™ Flange Sealant 518 Gasket Eliminator.

Figure 10:
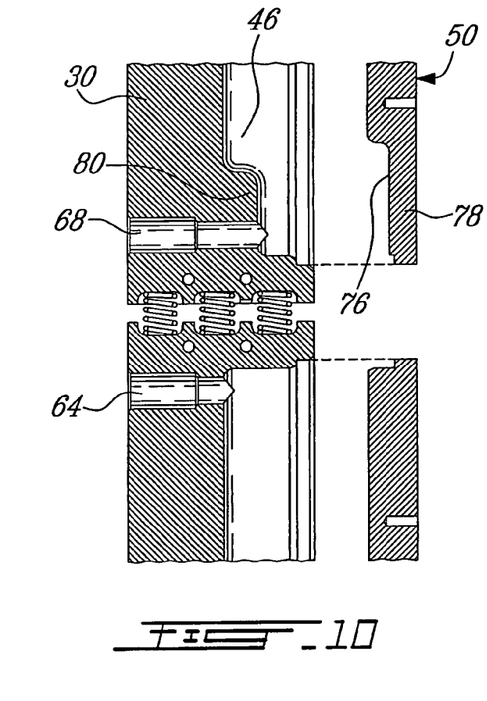
FIG. 10 is an exploded sectional view similar to FIG. 9.

FIGS. 9 and 10 illustrate that the cover 50 does not have the full T-shaped cross-section on its entire circumference. Indeed, a portion 76 of the cover 50 in the vicinity of the inlet 62 has a portion of the leg of the T-shape cross-section removed to thereby provide a thinner cover portion 78. Corresponding to this thinner cover portion 78 is a projection 80 integral with the body 30. This projection 80 may be viewed as a step in the channel 46. The combination of the thinner cover portion 78 and the projection 80 creates a direction change in the fluid passage, as is better seen in FIG. 9. This sudden change in direction causes the cooling fluid to loose its laminar flow properties and to become turbulent (see arrows 82). This turbulence improves the heat transfer from the body 30 to the cooling fluid since a larger portion of the cooling fluid enters in contact with the walls of the fluid passage 52.

One skilled in the art will understand that the fabrication of the cooling assembly 20 is pretty straightforward using conventional metal machining techniques. Indeed, since the cover 50 and the body 30 are two separate pieces they may easily be machined separately.

While the cover 50 is described herein as being mounted to the body via an adhesive, other means such as fasteners (not shown) could be used. Of course, the design of the cover could be modified accordingly to provide space for the fasteners and to allow the use of a gasket (not shown) between the body and the cover.

Alternatively, the cover 50 may be welded to the body 30 to thereby create a permanent fluid passage 52. If this is the case, the shape of the ledge 54 and of the shoulder 56 may be optimized to receive the weld.

It is also to be noted that while the turbulence generator defined by the combination of the thinner cover portion 78 and the projection 80 is illustrated herein as being in the vicinity of the inlet 62, it could be provided anywhere in the channel and could be present more than once.

Turning now briefly to FIGS. 11 and 12 of the appended drawings, a cooling device 100 according to a second illustrative embodiment of the present invention will de described. It is to be noted that since the cooling device 100 is very similar to the cooling device 10 of FIGS. 1 to 10, and for concision purposes, only the differences therebetween will be described herein.

The main difference between the cooling devices 100 and 10 concerns the biasing assembly 102.

The biasing assembly 102 includes first and second wedging devices 104 and 106 maintained together by three fastening assemblies 108. The biasing assembly 102 is to be mounted to the body 110 via opposed surfaces 112 and 114 of the body 110 as will be described hereinbelow. These opposed surfaces are defined by the generally C-shape of the body 110.

In the specific example illustrated in FIG. 12, the first and second opposed surfaces 112 and 114 are convex. More specifically, each of the first and second surfaces presents a substantially trapezoidal cross-section. In addition, the first and second wedging devices 104 and 106 each have a trapezoidal cross-section and have a longitudinal dimension substantially equal to a longitudinal dimension of the body 110.

The number of fastening assemblies 108 is not critical to the invention. Each fastening assembly 108 includes a deformable and biasing portion that transmits a reaction force to the first and second wedging devices 104 and 106 as will be described hereinbelow.

Each of the first and second wedging devices includes fastening apertures configured to accept a part of the fastening assembly. Furthermore, the wedging device 104 includes shoulder portions to accept the head of a fastener.

Each fastening assembly 108 includes a bolt 116 inserted through the shoulder portion and the matched fastening apertures of the first and second wedging devices 104 and 106. A deformable portion in the form of disc springs 118 is inserted onto each bolt 116 between the second wedging device 106 and a respective first nut 120. The disc springs 118 include, for example, one or more Belleville spring washers mounted in series. However, many other types of disc springs could be used. In addition, a second nut 122 is threaded onto each bolt 116 to positively lock the nuts onto the bolt.

Although the present invention has been described hereinabove by way of preferred embodiments thereof, it can be modified, without departing from the spirit and nature of the subject invention as defined in the appended claims.

What is claimed is:

1. A cooling assembly to be inserted in the internal stator of an electric machine, the internal stator being provided with an internal surface, the cooling assembly comprising:
   a tubular body provided with a gap and an external surface configured and sized as to be applied to the internal surface of the internal stator; the tubular body being provided with a bottom surface defining a cooling channel; the tubular body being also provided with an inlet and an outlet provided on either side of the gap and open to the cooling channel;
   a cover so configured and sized as to be mounted to the bottom surface so as to close the cooling channel;
   a biasing assembly so mounted to the body in the vicinity of the gap as to selectively bias the external surface of the body against the internal surface of the stator;
   wherein a fluid passage between the inlet and the outlet is defined by the cooling channel closed by the cover.

2. The cooling assembly recited in claim 1, wherein the cooling channel is provided with a shoulder portion and the cover has a corresponding T-shaped cross-section.

3. The cooling assembly as recited in claim 1, wherein the cooling channel is provided with a projection defining a direction change in the cooling channel.

4. The cooling assembly as recited in claim 1, wherein the cover includes a thinner portion corresponding to the projection.

5. The cooling assembly as recited in claim 1, wherein the cooling channel has a generally T-shaped cross-section.

6. The cooling assembly as recited in claim 5, wherein the cover has a generally T-shaped cross-section corresponding to a portion of the generally T-shaped cross section of the cooling channel.

7. The cooling assembly recited in claim 1, wherein the cover is secured to the body via an adhesive.

8. The cooling assembly of claim 1, wherein the cover is fastened to the body; the cooling assembly further including a gasket provided between the cover and the body to seal the fluid passage.

9. The cooling assembly as recited in claim 1, wherein the cover is welded to the body.

10. The cooling assembly as recited in claim 1, wherein the biasing assembly includes at least one compression spring mounted in the gap of the tubular body.

11. The cooling assembly as recited in claim 10, wherein the biasing assembly includes three compression springs mounted in shoulders provided in facing surfaces defining the gap of the tubular body.

12. The cooling assembly as recited in claim 1, wherein the biasing assembly includes two wedges and wherein the gap of the tubular body is defined by two convex surfaces; the wedges are so mounted to the tubular body by fasteners provided between the wedges that they biais the external surface of the tubular body towards the internal surface of the stator when they are brought closed together.

* * * * *